(12) United States Patent
Kensrue (10) Patent No.: US 6,998,575 B1
(45) Date of Patent: Feb. 14, 2006

(54) WELDING GUN

(76) Inventor: Milo M. Kensrue, 1073 Granville Dr., Newport Beach, CA (US) 92660

(*) Notice: Subject to any disclaimer, the term of this patent is extended or adjusted under 35 U.S.C. 154(b) by 0 days.

(21) Appl. No.: 10/370,043

(22) Filed: Feb. 19, 2003

Related U.S. Application Data (60) Provisional application No. 60/435,615, filed on Dec. 19, 2002.

(51) Int. Cl.
*B23K 9/00* (2006.01)
(52) U.S. Cl. .................. 219/137.31; 219/137.62
(58) Field of Classification Search ........... 219/137.31, 219/137.62
See application file for complete search history.

(56) References Cited

U.S. PATENT DOCUMENTS

| | | | |
|---|---|---|---|
| 2,808,498 A * | 10/1957 | Hudson et al. | 219/137.31 |
| 3,305,664 A | 2/1967 | Kensrue | 219/137.44 |
| D207,977 S | 6/1967 | Kensrue | D62/2 |
| 3,428,778 A * | 2/1969 | Blackman et al. | 219/137.31 |
| 3,463,902 A * | 8/1969 | Bircher | 219/137.42 |
| 3,488,468 A | 1/1970 | Carbone | 219/136 |
| 3,562,577 A * | 2/1971 | Kensrue | 314/71 |
| 3,744,694 A | 7/1973 | Kames et al. | 226/168 |
| 4,131,783 A | 12/1978 | Kensrue et al. | 219/124.31 |
| 4,403,136 A * | 9/1983 | Colman | 219/137.31 |
| 4,727,238 A * | 2/1988 | Mann | 219/137.41 |
| 4,845,336 A | 7/1989 | Samokovliiski et al. | 219/137.2 |
| 4,954,690 A * | 9/1990 | Kensrue | 219/137.31 |
| 5,132,513 A * | 7/1992 | Ingwersen et al. | 219/137.31 |
| 5,488,217 A * | 1/1996 | Ni | 219/137.31 |
| 5,595,671 A | 1/1997 | David | 219/137.62 |
| 5,728,995 A | 3/1998 | Kensrue | 219/137.31 |
| RE36,997 E | 12/2000 | Kensrue | 219/137.31 |
| 6,225,599 B1 | 5/2001 | Altekruse | 219/137.31 |
| 6,271,497 B1 | 8/2001 | Zapletal | 219/121.36 |
| 6,740,848 B1 * | 5/2004 | Parker | 219/137.31 |

OTHER PUBLICATIONS

Figure 1 is an assembly drawing of a welding gun that was on sale before Dec. 19, 2001 (provided in item 13 of the Information Disclosure Statement of Jun. 26, 2003).*
Figure 1 is an assembly drawing of a welding gun that was on sale before Dec. 19, 2001.
Figure 2 is an assembly drawing of a welding gun that was on sale before Dec. 19, 2001.
Figure 3 is an assembly drawing of the Cobra™ welding gun, which was discussed in the Summary of the Invention and was on sale before Dec. 19, 2001.

(Continued)

*Primary Examiner*—Kevin P. Kerns
(74) *Attorney, Agent, or Firm*—Knobbe, Martens, Olson & Bear, LLP.

(57) ABSTRACT

An in-line welding gun includes a mounting block, a wire feed mechanism and a torch barrel. A motor is positioned behind the mounting block along a longitudinal axis of the gun. The torch barrel curves away from the longitudinal axis. The motor and the torch barrel are surrounded by a substantially rigid shell comprising a tubular portion and a torch portion.

36 Claims, 9 Drawing Sheets

OTHER PUBLICATIONS

Figure 4 is an assembly drawing of a welding gun that was on sale before Dec. 19, 2001.
Chart 1 is a label of parts for the part numbers used in Figure 4.

Figure 5 is assembly drawing of a welding gun that was on sale before Dec. 19, 2001.
Figure 6 is an assembly drawing of a welding gun that was on sale before Dec. 19, 2001.

* cited by examiner

WELDING GUN

PRIORITY INFORMATION

This application claims the priority benefit under 35 U.S.C. § 119(e) of Provisional Application 60/435,615 filed Dec. 19, 2002.

BACKGROUND OF THE INVENTION

1. Field of the Invention

This invention relates to a welding gun and, in particular, to an in-line MIG welding gun.

2. Description of the Related Art

A MIG welding gun generally comprises a handle, a wire feed mechanism, a motor for driving the wire feed mechanism and a torch barrel. The welding gun typically also includes a gas tube and a cooling fluid tube for supplying gas and cooling fluid to the tip of the torch barrel.

There are two general types of welding guns: pistol grip and in-line welding guns. In a pistol grip gun, the motor is located below the wire feed mechanism and lies along an axis that lies generally perpendicular to the longitudinal axis of the gun. In contrast, in an in-line gun, the motor lies along the longitudinal axis of the gun and is positioned generally behind the wire feed mechanism.

Torch barrels may be straight or curved (e.g., "goose necked") depending upon the type of welding to be accomplished and the preferences of the welder. In some arrangements, the welding gun is configured such that the operator can change the angular position of a curved barrel relative to the wire feed mechanism. Such welding guns generally require relatively complicated connections between the torch barrel and the gas and cooling fluid tubes. In contrast, welding guns in which the torch barrel is stationary are relatively less complicated and expensive. As such, welding guns with stationary torch barrels are particularly popular.

SUMMARY OF THE INVENTION

One particularly popular type of welding gun has been sold by MK Products Inc. of Irvine, Calif. under the trade name Cobra™. This welding gun is an in-line welding gun with a stationary torch barrel. To protect the user, the torch barrel in this welding gun is embedded in an insulating material by compression molding. This technique for insulating the torch barrel has become unsatisfactory because during manufacturing the compression molding may collapse the tubes in the torch barrel, in which case the torch barrel is discarded. In addition, if the torch barrel becomes damaged after being sold, the insulating material is difficult to remove, making repairs to the torch barrel difficult if not impossible.

Another problem associated with the Cobra™ welding gun is that the gas and water tubes extend through the handle, around the wire feeding mechanism and into the torch barrel. This arrangement has several disadvantages. For example, this arrangement increases the width of the gun. In addition, if the torch barrel is damaged the entire length of the gas and cooling fluid tubes must be replaced.

It would also be advantageous to provide a welding gun with cooled torch barrel and a larger welding tip so that larger amps can be used without appreciably increasing the size or weight of the welding gun.

Accordingly, one aspect of an embodiment of the present invention involves a welding gun with a substantially rigid shell comprising a tubular portion and a torch portion. The tubular portion extends generally about a first longitudinal axis and the torch portion extends generally about a curved line that curves away from the longitudinal axis. A motor having an axis generally aligned with the first axis of said tubular portion is positioned within the tubular portion. A wire feed mechanism is positioned within the generally tubular portion and comprises a feeder roller. The feeder roller is coupled to and driven by the motor. A block is positioned within the generally tubular portion and is configured to support the idler and feeder rollers such that they rotate about axes that extend generally perpendicular to the longitudinal axis of the tubular portion. The block defines a coolant path and an inert gas path. The coolant and inert gas paths extend from a proximal end of the block to a front face of the block and extend generally beneath the wire feed mechanism. At least the majority of a torch barrel is positioned within the torch portion of the housing. The torch barrel is removably fixed to a mounting plate that is fixed to a front face of the block. The torch barrel curves away from the longitudinal axis of the tubular portion. The mounting plate includes an inert gas connection portion for connecting the inert gas path with an inert gas conduit that extends through the torch barrel, and a coolant connection portion for connecting to the coolant path. A welding tip is coupled to the torch barrel. A wire path having an inlet portion extends through the mounting plate and the torch barrel so as to direct wire from the wire feed mechanism to the welding tip.

Another aspect of an embodiment of the present invention is a welding gun comprising a substantially rigid shell comprising a tubular portion and a torch portion. The tubular portion extends generally about a first longitudinal axis and the torch portion extends generally about a curved line that curves away from the longitudinal axis. A wire feed mechanism that is positioned in the tubular portion and comprises a feeder roller. A mounting block is positioned in the tubular portion and is configured to support the idler and feeder rollers. A motor drives the wire feed mechanism and is positioned generally behind the wire feed mechanism in the tubular portion. A torch barrel is coupled to the mounting block. The torch barrel curves away from the longitudinal axis of the welding gun and is positioned in the torch portion of the housing. A housing is formed from a first piece and a second piece, which are joined at an interface that lies generally in a plane that contains the first longitudinal axis and the curved line.

DETAILED DESCRIPTION OF THE PREFERRED EMBODIMENT

Figure 1:
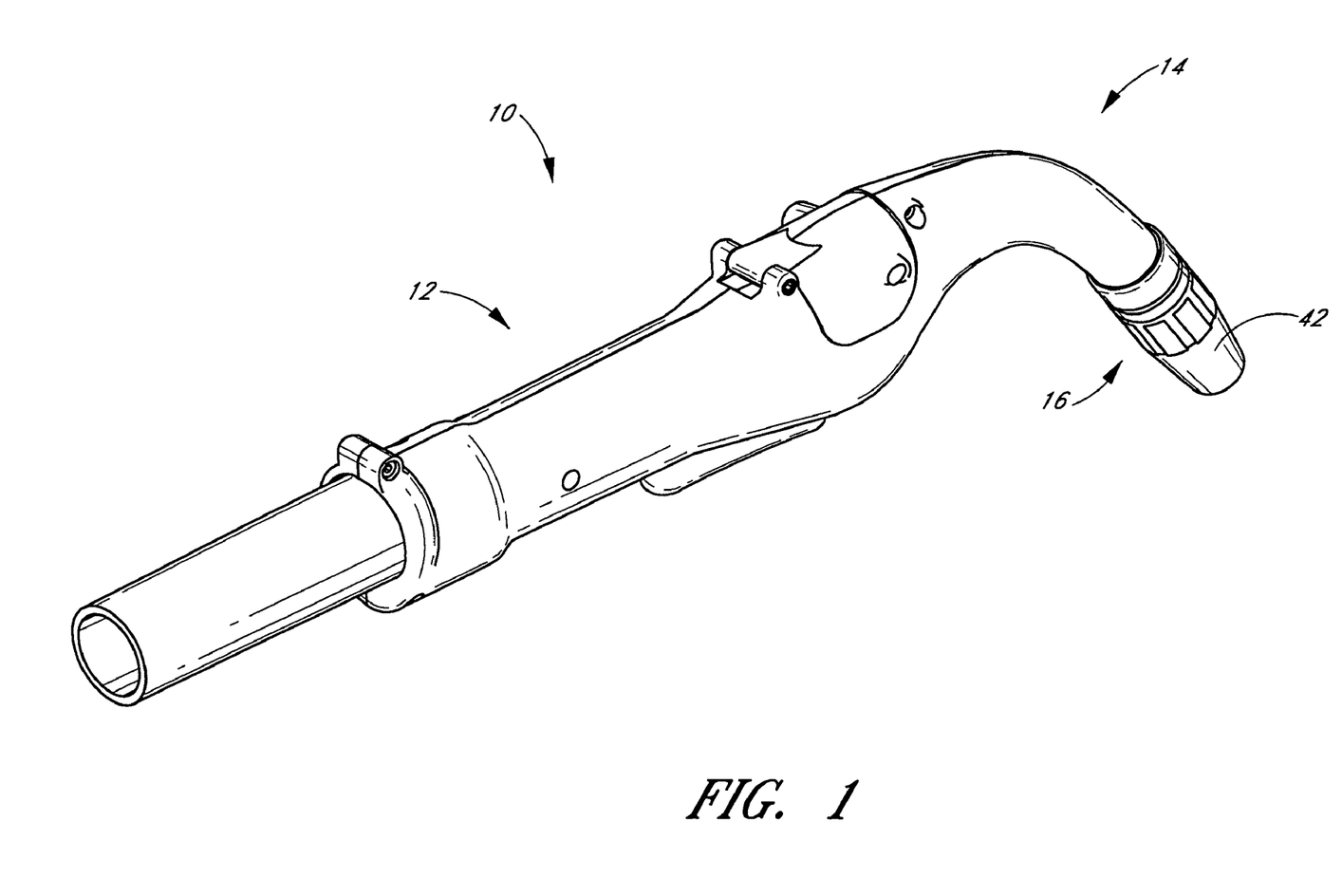
FIG. 1 is a perspective view of a welding gun having certain features and advantages according to the present invention.
Figure 2:
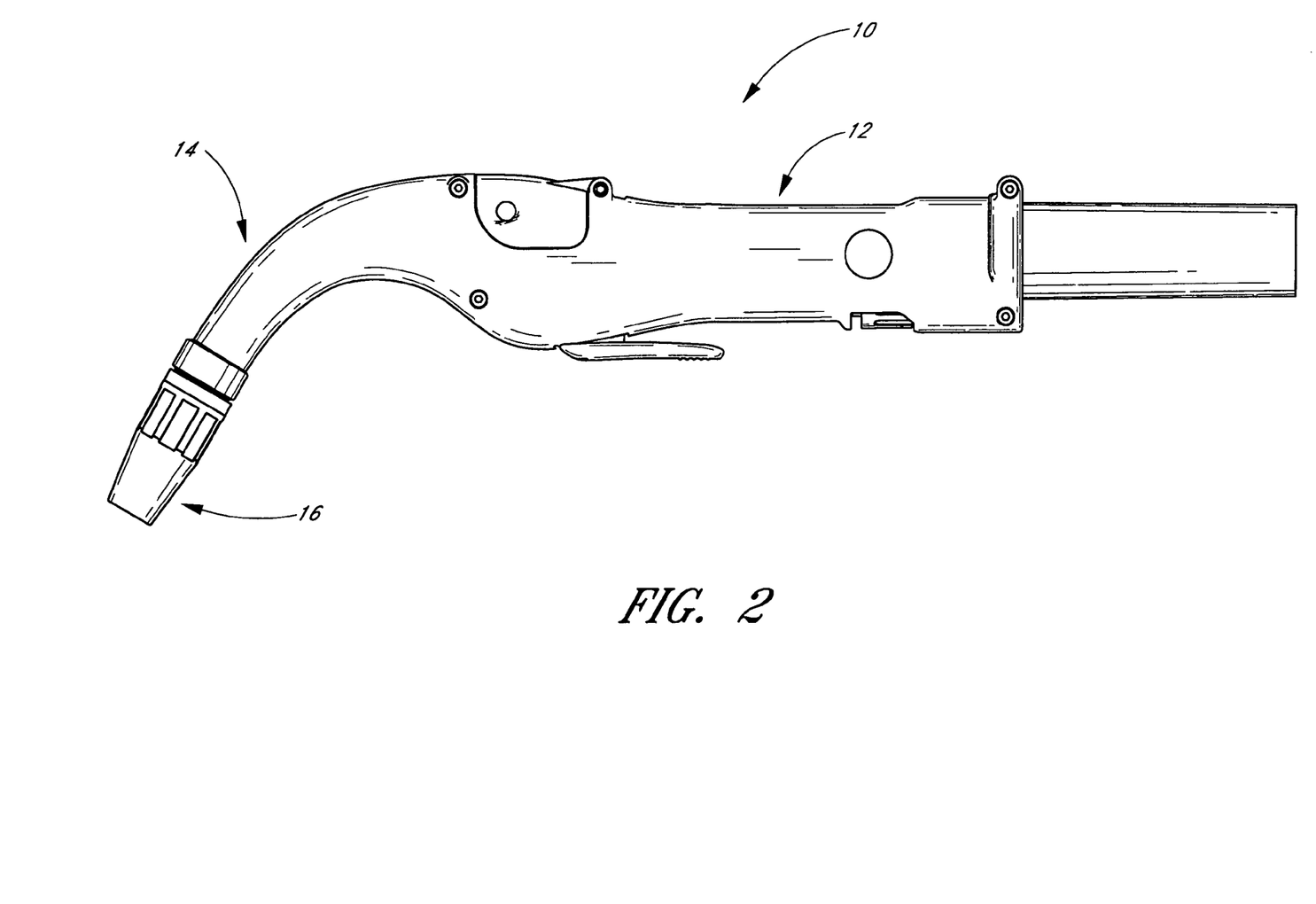
FIG. 2 is a side elevational view of the welding gun of FIG. 1.
Figure 3:
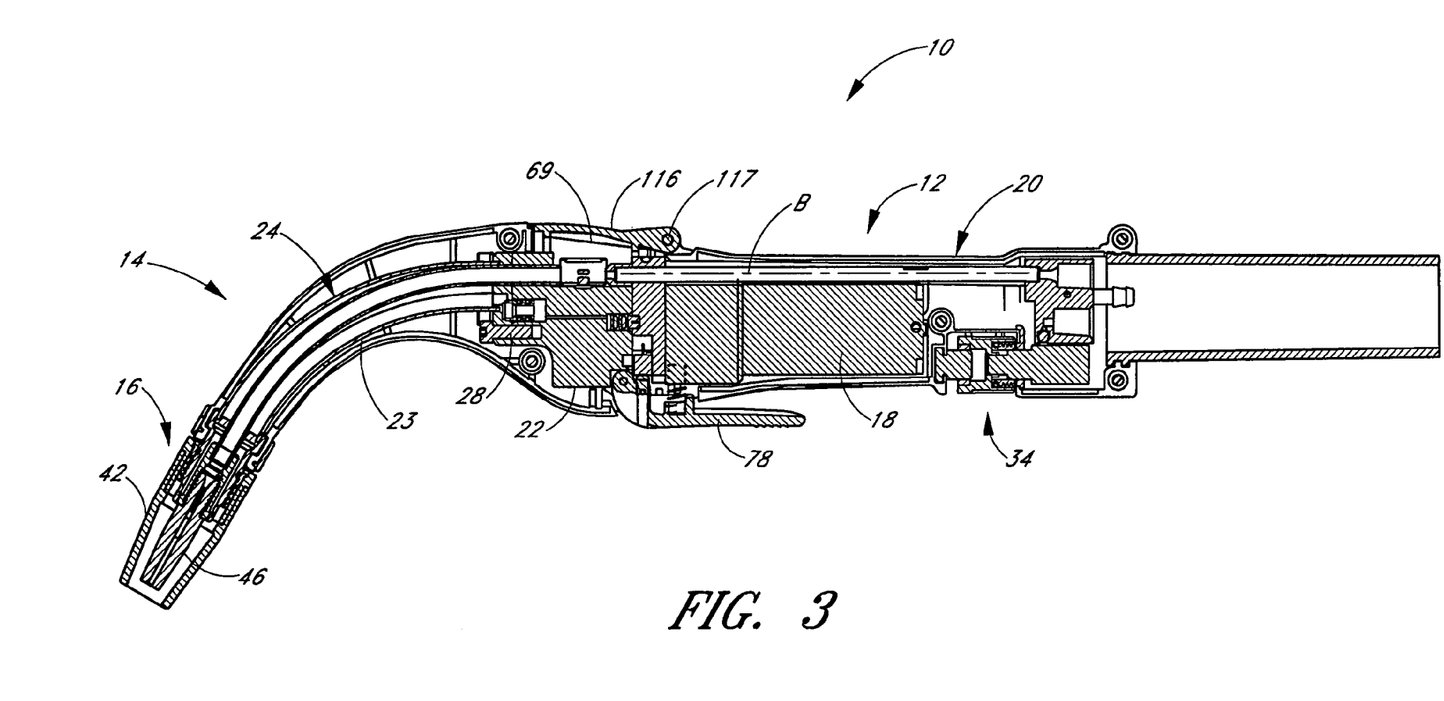
FIG. 3 is a cross-sectional view of the welding gun of FIG. 1

FIGS. 1 and 2 are a perspective and a side view of an illustrated embodiment of a welding gun 10 having certain features and advantages according to the present invention. In the illustrated embodiment, the gun 10 includes a handle 12, a torch barrel section 14 and a welding tip 16. FIG. 3 is a cross-sectional view of the gun 10 and illustrates a motor 18, which is positioned inside the handle 12 generally along the longitudinal axis of the gun 10. The illustrated gun 10, therefore, is an "in-line" welding gun. The handle 12 and barrel section 14 are covered by a substantially rigid, two-piece molded plastic casing 20a, 20b, which is best seen in FIG. 4 and will be described in more detail below.

Figure 4:
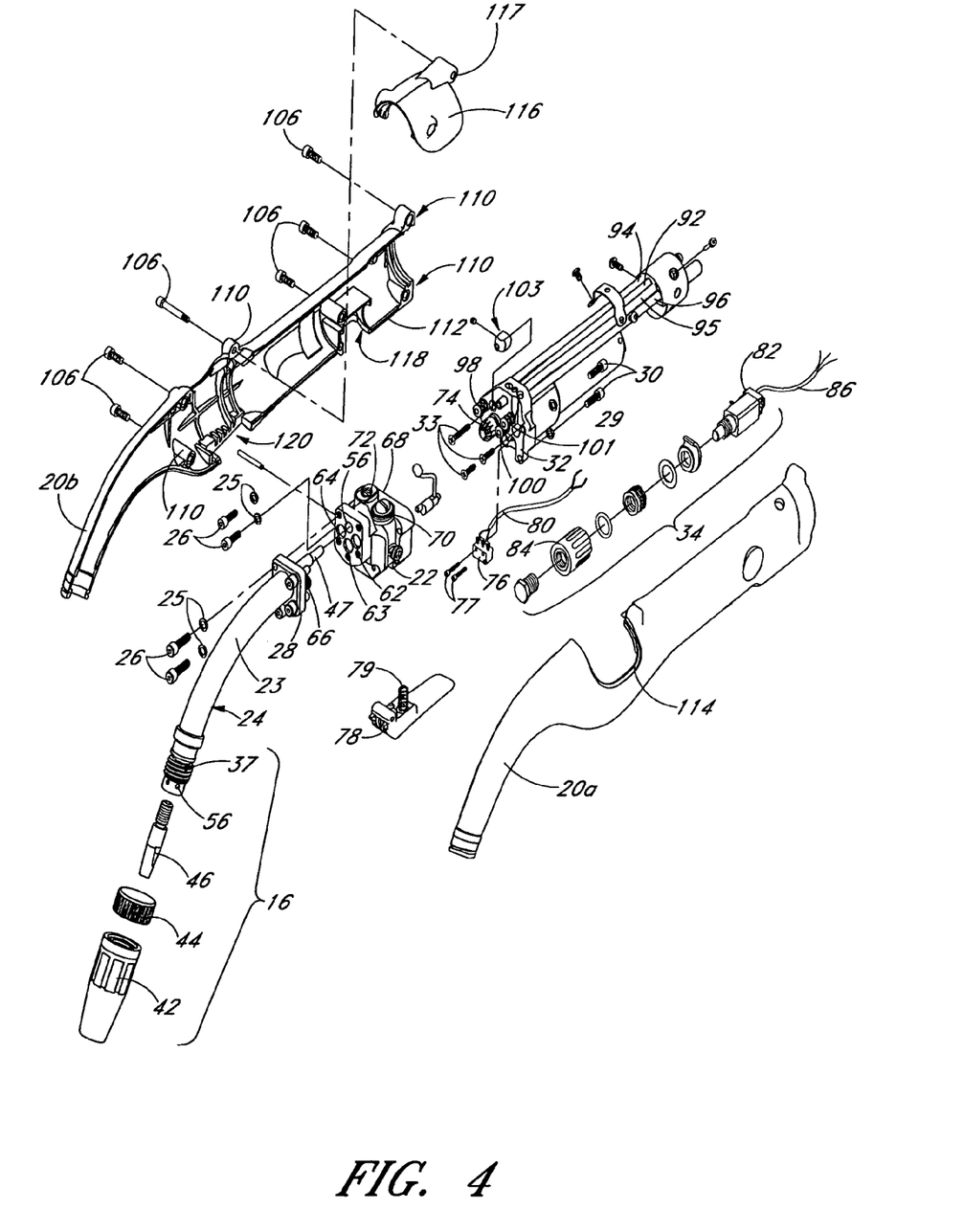
FIG. 4 is an exploded perspective view of the welding gun of FIG. 1.

With particular reference to FIGS. 3 and 4, the gun 10 includes a block 22, which is preferably made of aluminum. A torch barrel assembly 24 (see also FIG. 5) is removably attached to a distal end of the block 22 by washers 25 and bolts 26, which extend through a barrel mount 28 and into the block 22. In a similar manner, the motor 18 removably attached to a proximal end of the block 22 by washers 29 and bolts 30, which extend through a motor mount 32 that is also attached to the motor 18 by bolts 33. A speed control mechanism 34, for controlling the speed of the motor, is attached to the proximal end of the motor 18. The plastic casing 20a, 20b, encloses the block 22, the barrel 24 and the motor 18 when these components are assembled together.

The barrel assembly 24 will now be described in more detail with reference to FIGS. 5–8. As best seen in FIGS. 3 and 7, the barrel assembly 24 extends along a line A that curves away from the longitudinal axis B of the welding gun 10. As illustrated in FIG. 7, the barrel assembly 24 includes an outer sheath 23, which defines a barrel cavity 34. The barrel cavity 34 is closed at the proximal end 27 by the barrel mount 28 and at the distal end 35 by a cap 36. A gas nozzle 37 is fitted over the cap 36 and the distal end 35 of the barrel 24. The gas nozzle 37 includes outer threads 40, for attaching a gas assembly cup 42 and nut 44, which are illustrated in FIG. 4.

Figure 7:
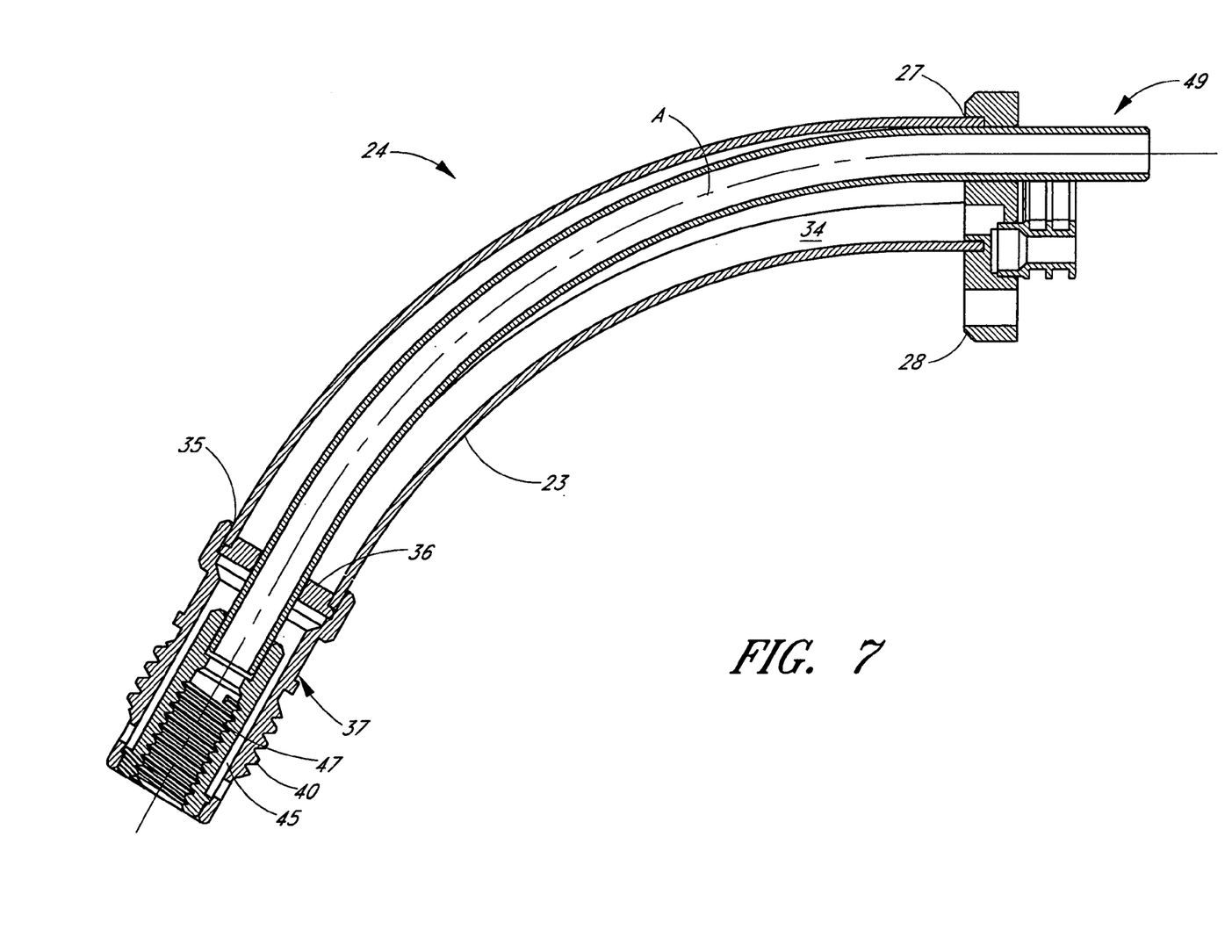
FIG. 7 is a cross-sectional view taken along line 7—7 of FIG. 6.
Figure 8:
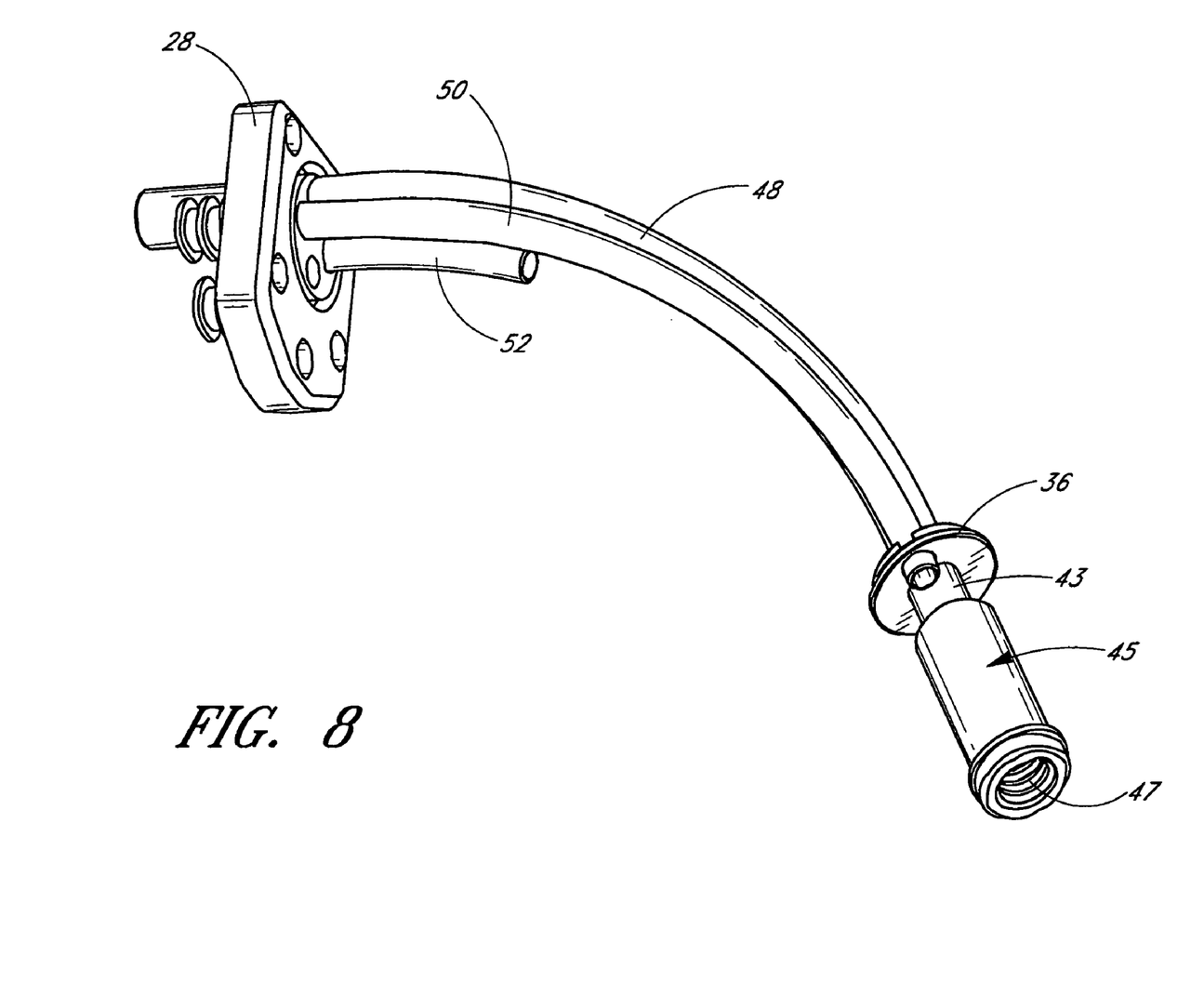
FIG. 8 is a side perspective view of the barrel section with the barrel

With particular reference to FIGS. 7 and 8, the barrel assembly 24 preferably includes a wire tube 49, a gas tube 50 and a coolant tube 52 that extend from the barrel mount 28 within the outer sheath 23, which is not illustrated in FIG. 8. In the illustrated embodiment, a tip attachment 45 is secured to the distal end 43 of the wire tube 49 and is positioned in the gas nozzle 37. The tip attachment 45 includes internal threads 47 such that a wire tip 46 (see FIG. 4) can be attached to the tip attachment 45. An inlet 49 of the wire tube 49 extends through the barrel mount 28.

As best seen in FIGS. 4 and 8, the gas tube 50 extends through the cap to deliver gas to the gas nozzle 37. The gas nozzle 37 includes a set of openings 56 through which gas can be discharged to shield the tip of the wire (not shown) when the work piece is being welded. With particular reference to FIG. 8, in the illustrated embodiment, the water tube 52 extends in the outer sheath 23 half way to the cap 36 to provide cooling fluid to the torch barrel assembly 24. The gas nozzle 37, tip attachment 45, wire tip 46 and cup 42 (see FIG. 4) together define the welding tip 16 in the illustrated arrangement.

Figure 5:
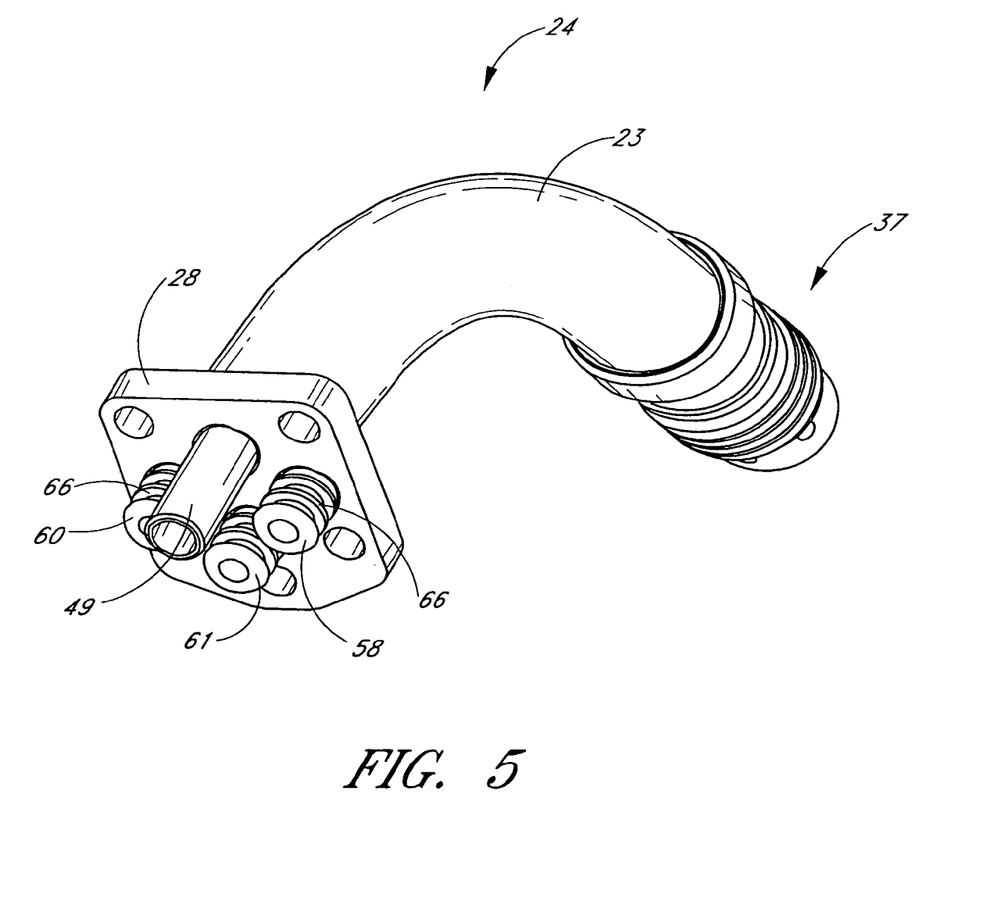
FIG. 5 is a side perspective view of a barrel section of the welding gun of FIG. 1.
Figure 6:
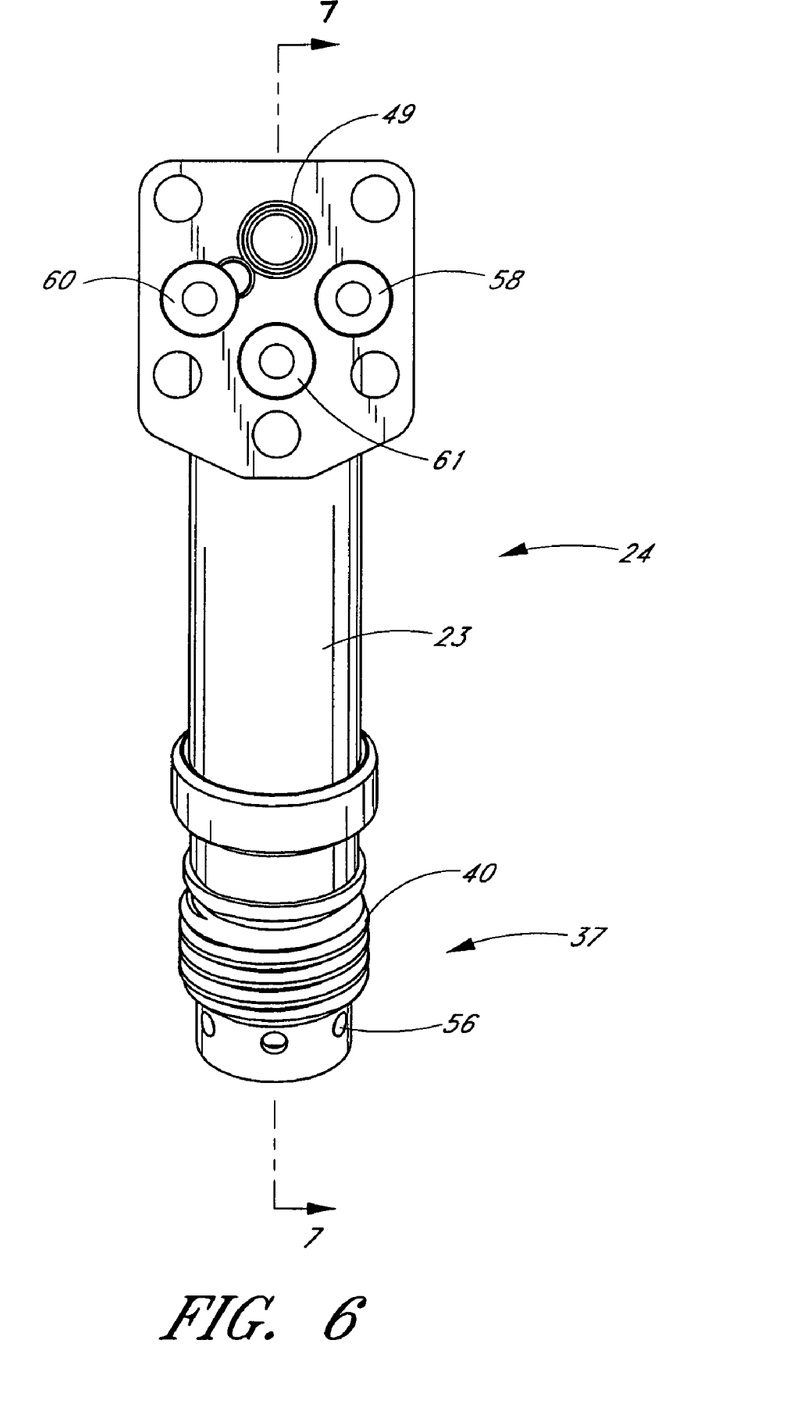
FIG. 6 is a front elevational view of the barrel section of FIG. 1.

With reference to FIGS. 5 and 6, the gas and coolant tubes 50, 52 are connected to connectors 58, 60, which are configured to fit within a gas and coolant openings 62, 64 provided in the block 22 (see FIG. 4). The connectors 58, 60, 61 preferably include O-rings 66 to provide prevent leaks. As best seen in FIG. 5, in the illustrated embodiment, the connectors 58, 60 are preferably located below the inlet of the wire tube 49. In addition, the connectors 58, 60 are preferably located on opposite sides of the inlet to the wire tube 49. This arrangement is preferred because it allows the wire, gas and water tubes 48, 50, 52 to be centered within the outer sheath 23. Such an arrangement provides for an efficient use of space within the outer sheath 23, which permits a larger diameter of the tubular member 49. As will be explained in more detail below, in some arrangements, the larger diameter of the outer sheath 23 allows for more effective cooling of the torch barrel assembly 24.

The illustrated arrangement also includes a coolant return connector 61 (see FIGS. 5 and 6). The coolant return connector 61 is configured to fit within a coolant return opening 63 provided in the block 22 (see FIG. 4). The illustrated coolant return connector 61 is in direct communication with the barrel cavity 34. As such, in the illustrated arrangement, cooling fluid can flow through the coolant tube 52 to the cap 36 so as to fill the barrel cavity 34 with cooling fluid. The coolant is then discharged through the coolant return connector 61. In modified arrangements, the position and arrangement of the coolant tube 52 and coolant return connector 61 can be reversed or modified. The illustrated arrangement advantageously cools the entire length of the torch barrel assembly 24. In addition, because of the efficient use of space which permits a larger diameter for the outer sheath 23, more cooling fluid can be circulated through the torch barrel cavity 34. This permits the use of a larger welding tip 16 that can utilize more amps.

With reference now to FIGS. 3 and 4, the block 22 includes a cut away section 68 to provide a recess in which is seated a wire feed mechanism 69 known in the art, which in the illustrated embodiment comprises an idler roller 70, a drive roller 72 and a wire path therebetween. The motor 18 includes a drive shaft 74, which extends into the block 22. The driver roller 72 is coupled to a shaft (not shown), which extends into the block 22 and is driven by the drive shaft 74. The idler roller 70 is mounted on a hinge like member 74 that pivots so that the idler roller 70 can be moved towards or away from the drive roller 54.

As illustrated in FIG. 4, a micro switch 76 is removabely attached to the under side of the block 22 by bolts 77. The micro switch 76 is activated by a contact arm 78 which is biased by a spring 79 and, when actuated, closes the switch 76 to allow electrical energy to drive the motor 22. A cable 80 connects the switch 76 to the motor 22. As mentioned above, the speed control mechanism 34 is positioned just behind the motor 22. The speed control mechanism 34 includes a micro-controller 82, which is adjusted through a knob 84. The micro-controller 82 is, in turn, connected through a second cable 86 to a wire feeder (not shown) and/or the motor 22 for controlling the wire feed speed.

Figure 9:
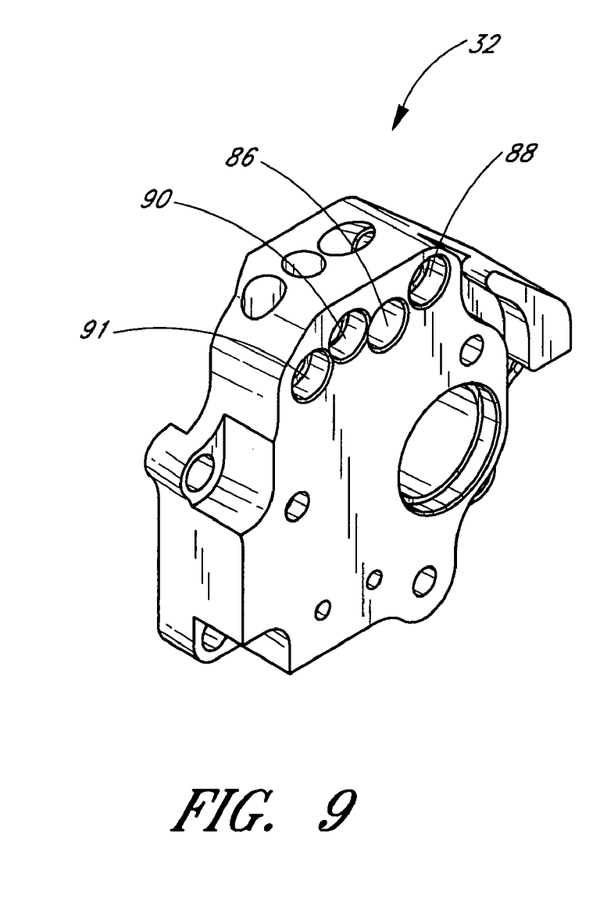
FIG. 9. is a rear perspective view of a motor mount of the welding gun of FIG. 1.

As shown in FIG. 9, the rear of the illustrated motor mount 32 has four bores 86, 88, 90, 91 which serve as the sites for connecting, respectively, a welding wire conduit 95 (see FIG. 4) through which the welding wire (not shown) is fed, a gas conduit 94, a cooling fluid conduit 92 (see FIG. 4), and a cooling fluid return conduit 96 (see FIG. 4). A power cable is electrically connected to the block 22. Current can then flow from the cable along the block 22 through the wire tube 49, the torch barrel 23 and the torch barrel assembly 24 to the wire tip attachment 46. An arc forms between the tip of the wire and the work piece. Thus, the current flows to the welding wire as it exits the welding tip 16.

Figure 10:
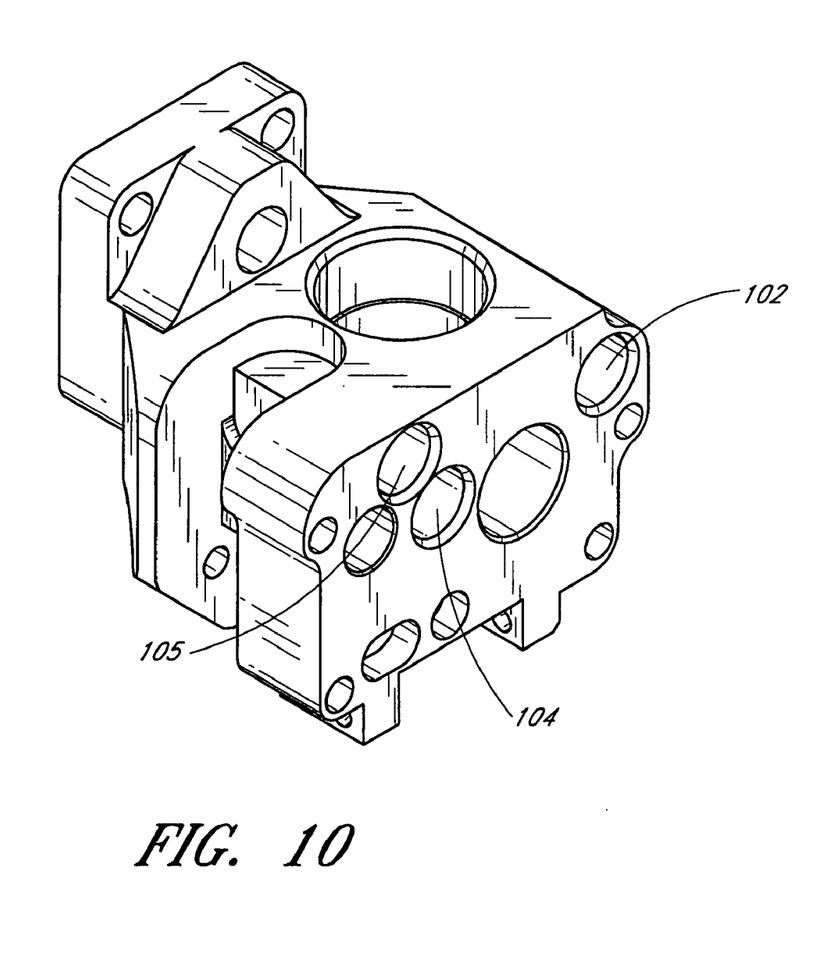
FIG. 10 is a rear perspective view of a block of the welding gun of FIG. 1.

As seen in FIG. 4, the motor mount 32 includes a gas connector 98, a cooling fluid connector 100, and a cooling fluid return connector 101. These connectors 98, 100 fit into openings 102, 104, 105 formed in the rear of the block 22 (see FIG. 10). The wire conduit 95 extends through the motor mount 32 and is attached to a guide 103, which directs the wire between the driver and idler rollers 70, 72 and into the wire tube 49. The gas and cooling fluid openings 102, 104 open in to passages (not shown), which are formed in the block 22 and preferably extend below the drive and idler rollers 70, 72. These passages place the gas conduit 94 in communication with the gas tube 50 and the cooling fluid conduit 96 in communication with the cooling fluid tube 52.

With reference now to FIGS. 1–4, the casing 20 is preferably molded of a suitable plastic material which serves as both an electrical and heat insulator. The casing 20 is divided into two sections 20a and 20b which are essentially mirror images of one another and include a series of mounting sites 110 along their edges which allows the casing to be screwed together by screws 106 that are received in the mounting sites 104. The two sections 20a,b preferably also form interlocking lap joints 112 to facilitate a smooth fit. The sections 20a,b fit snugly around and cover the mounting block 22, motor 18, the speed control mechanism 34 and the barrel 24. As such, in the illustrated arrangement, the casing 20 terminates at its distal end at the gas cup 42 and at its proximal end behind the motor 18. At the distal end, the nut 44 secures the casing 20 around the torch barrel 24.

This casing 20 has a first opening 114 to provide access to the drive and idler rollers 72, 70. A door 116 is preferably covers the opening 114 and is attached to the casing by a hinge 117. A second opening 118 is provided at the proximal end of the handle 12 to allow access to the control knob 84 of the speed controller 34. A third opening 120 is provided for the lever 78.

The casing 20 electrically isolates the block 22 and the torch barrel 24. Advantageously, a repairman can easily disassemble the casing 20 to provide access to the internal components of the gun 10 which can then be tested and replaced if necessary. For example, if the touch barrel assembly 24 becomes damaged, the bolts 106 can be removed and the casing 20 can be separated into two halves 20a, 20b. In this manner, the repairman has access to all of the internal components of the welding gun. The torch barrel 24 can then be separated from the block 22 by removing the bolts 26 from the torch barrel mounting plate 28 and disconnecting the connectors 58, 60, 61 from the openings 62, 64, 63 in the block 22. A new or repaired torch barrel 24 can then be attached to the block 22 and the casing 20 can be reassembled. In contrast, in the Cobra™ welding gun, the gas and cooling fluid tubes are extended through the handle of the gun and thus the entire length of the tubes must be replaced if damaged.

Another advantage of the casing 20 is that it can be made by injection molding, which is relatively inexpensive. In addition, the casing 20 eliminates the risk of crushing the outer sheath 23 as can happen when compression molding is used as described above.

Yet another advantage of the illustrated arrangement is that because of the efficient positioning of the connectors 58, 60, 61, the outer sheath 23 can be enlarged without appreciably increasing the size, shape or weight of the welding gun 10. This allows more cooling fluid to be circulated through the torch barrel cavity 34 and permits the use of a larger welding tip 16 that can utilize more amps. The illustrated arrangement also advantageously cools the entire length of the torch barrel assembly 24.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A welding gun comprising:
    a substantially rigid shell comprising a tubular portion and a torch portion, the tubular portion extending generally about a first longitudinal axis and the torch portion extending generally about a curved line that curves away from the longitudinal axis,
    a motor having an axis generally aligned with said first axis of said tubular portion and positioned within said tubular portion,
    a wire feed mechanism within said generally tubular portion that comprises an idler roller and a feeder roller, said feeder roller being coupled to and driven by the motor,
    a block within said generally tubular portion that is configured to support the idler and feeder rollers such that they rotate about axes that extend generally perpendicular to the longitudinal axis of the tubular portion, the block defining a coolant path and an inert gas path, the coolant and inert gas paths extending from a proximal end of the block to a front face of the block and extending generally beneath the wire feed mechanism;
    a torch barrel, at least the majority of which is positioned within said torch portion of said shell, removably fixed to a mounting plate that is fixed to a front face of the block; the torch barrel curving away from the longitudinal axis of the tubular portion, the mounting plate including an inert gas connection portion for connecting the inert gas path with an inert gas conduit that extends through the torch barrel, and a coolant connection portion for connecting to the coolant path;
    a welding tip that is coupled to the torch barrel, the torch barrel being substantially centered within the torch portion of the rigid shell;
    a wire path having an inlet portion and extending through the mounting plate and the torch barrel so as to direct wire from the wire feed mechanism to the welding tip.

2. The welding gun of claim 1, wherein the inert gas connection portion is below the inlet portion of the wire path.

3. The welding gun of claim 2, wherein the coolant connection portion is below the inlet portion of the wire path.

4. The welding gun of claim 3, wherein the coolant and inert gas connection portions are located on opposite sides of the inlet portion of the wire path.

5. The welding gun of claim 1, wherein the block further defines a coolant return path which extends from a proximal end of the block to a front face of the block generally beneath the wire feed mechanism.

6. The welding gun of claim 5, wherein the mounting plate further includes a coolant return path connection portion.

7. The welding gun of claim 6, wherein the coolant return path connection portion is below the inlet portion of the wire path.

8. The welding gun of claim 7, wherein the inert gas connection portion and the coolant connection portion are below the inlet portion of the wire path.

9. The welding gun of claim 8, wherein the coolant and inert gas connection portions are located on opposite sides of the inlet portion of the wire path.

10. The welding gun of claim 8, wherein the coolant return connection portion is located between the coolant and inert gas connection portions.

11. The welding gun of claim 10, wherein the coolant return connection portion is located generally below the inlet portion of the wire path.

12. The welding gun of claim 8, wherein the torch barrel defines a coolant chamber which covers at least a portion of the wire path, the coolant connection portion and the coolant return connection portion being in communication with the cooling chamber.

13. A welding gun as in claim 1, wherein the shell comprises a first half and a second half that are generally symmetrical.

14. A welding gun as in claim 13, wherein the first and second halves of the shell comprise unitary pieces that extend from the proximal end of the tubular portion to the welding tip.

15. A welding gun comprising:
a substantially rigid shell comprising a tubular portion and a torch portion, the tubular portion extending generally about a first longitudinal axis and the torch portion extending generally about a curved line that curves away from the longitudinal axis;
a wire feed mechanism that is positioned in the tubular portion and comprises an idler roller and a feeder roller;
a mounting block that is also positioned in the tubular portion and is configured to support the idler and feeder rollers;
a motor that drives the wire feed mechanism, the motor being positioned generally behind the wire feed mechanism in the tubular portion;
a torch barrel that is coupled to the mounting block, the torch barrel curving away from the longitudinal axis of the welding gun and a curved portion of said torch barrel being substantially centered within the torch portion of the shell,
the shell being formed from a first piece and a second piece which are joined at an interface that lies generally in a plane that contains the first longitudinal axis and the curved line.

16. The welding gun as in claim 15, comprising a welding tip, an inert gas conduit, a coolant conduit, and a wire conduit, the inert gas, coolant and wire conduits all extending through the torch barrel to the welding tip.

17. The welding gun of claim 16, wherein an inlet to the inert gas conduit is located below an inlet to the wire conduit.

18. The welding gun of claim 17, wherein an inlet to the coolant conduit is located below the inlet to the wire conduit.

19. The welding gun of claim 18, wherein the inlets to the coolant and inert gas conduits are located on opposite sides of the inlet of the wire conduit.

20. The welding gun of claim 16, further comprising a coolant return conduit which is in communication with an interior of the torch barrel.

21. The welding gun of claim 20, wherein an inlet of the coolant return conduit is below an inlet of the wire conduit.

22. The welding gun of claim 21, wherein an inlet of an inert gas conduit and an inlet of the coolant conduit are also positioned below the inlet of the wire conduit.

23. The welding gun of claim 22, wherein the inlets to the coolant and inert gas conduits are located on opposite sides of the inlet of the wire conduit.

24. The welding gun of claim 23, wherein the inlet to the coolant return conduit is located between inlets of the coolant and inert gas conduits.

25. A welding gun comprising:
a substantially rigid shell comprising a tubular portion and a torch portion, the tubular portion extending generally about a first longitudinal axis and the torch portion extending generally about a curved line that curves away from the longitudinal axis;
a wire feed mechanism that is positioned in the tubular portion;
a mounting block that is also positioned in the tubular portion;
a motor that drives the wire feed mechanism, the motor being positioned generally behind the wire feed mechanism in the tubular portion;
a torch barrel that is coupled to the mounting block, the torch barrel curving away from the longitudinal axis of the welding gun and a curved portion of said torch barrel being substantially centered in a horizontal direction within the torch portion of the shell,
the shell being formed from a first piece and a second piece which are joined at an interface that lies generally in a plane that contains the first longitudinal axis.

26. The welding gun of claim 25, wherein the wire feed mechanism includes an idler roller and a feeder roller.

27. The welding gun of claim 26, wherein the idler roller and the feeder roller are supported by the mounting block.

28. The welding gun as in claim 25, comprising a welding tip, an inert gas conduit, a coolant conduit, and a wire conduit, the inert gas, coolant and wire conduits all extending through the torch barrel to the welding tip.

29. The welding gun of claim 28, wherein an inlet to the inert gas conduit is located below an inlet to the wire conduit.

30. The welding gun of claim 29, wherein an inlet to the coolant conduit is located below the inlet to the wire conduit.

31. The welding gun of claim 30, wherein the inlets to the coolant and inert gas conduits are located on opposite sides of the inlet of the wire conduit.

32. The welding gun of claim 28, further comprising a coolant return conduit which is in communication with an interior of the torch barrel.

33. The welding gun of claim 32, wherein an inlet of the coolant return conduit is below an inlet of the wire conduit.

34. The welding gun of claim 33, wherein an inlet of an inert gas conduit and an inlet of the coolant conduit are also positioned below the inlet of the wire conduit.

35. The welding gun of claim 34, wherein the inlets to the coolant and inert gas conduits are located on opposite sides of the inlet of the wire conduit.

36. The welding gun of claim 35, wherein the inlet to the coolant return conduit is located between inlets of the coolant and inert gas conduits.

* * * * *